United States Patent
Heinonen et al.

(10) Patent No.: US 6,418,308 B1
(45) Date of Patent: Jul. 9, 2002

(54) OPINION POLL UTILIZING A WIRELESS DATA TRANSMISSION CONNECTION

(75) Inventors: Pekka Heinonen; Harri Okkonen, both of Espoo; Ilkka Tuomi, Helsinki, all of (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/242,955
(22) PCT Filed: Aug. 26, 1997
(86) PCT No.: PCT/FI97/00490
§ 371 (c)(1), (2), (4) Date: Apr. 5, 1999
(87) PCT Pub. No.: WO98/09451
PCT Pub. Date: Mar. 5, 1998

(30) Foreign Application Priority Data

Aug. 29, 1996 (FI) .................................................. 963375

(51) Int. Cl.[7] ............................................... H04M 3/42
(52) U.S. Cl. ..................... 455/414; 455/426; 455/466; 455/458; 455/560
(58) Field of Search .................... 455/422, 432, 455/433, 458, 445, 466; 370/338

(56) References Cited

U.S. PATENT DOCUMENTS

| | | | | |
|---|---|---|---|---|
| 4,816,904 A | * | 3/1989 | McKenna et al. | 725/11 |
| 4,878,242 A | * | 10/1989 | Springer et al. | 379/204 |
| 5,036,389 A | * | 7/1991 | Morales | 725/24 |
| 5,212,806 A | * | 5/1993 | Natarajan | 455/525 |
| 5,226,177 A | * | 7/1993 | Nickerson | 455/517 |
| 5,311,507 A | * | 5/1994 | Bedrossian | 370/360 |
| 5,315,636 A | * | 5/1994 | Patel | 379/58 |
| 6,014,427 A | * | 1/2000 | Hanson et al. | 379/67.1 |
| 6,052,591 A | * | 4/2000 | Bhatia | 455/445 |
| 6,058,303 A | * | 5/2000 | Astrom et al. | 455/413 |
| 6,091,961 A | * | 7/2000 | Khalil | 455/466 |
| 6,151,620 A | * | 11/2000 | Madsen et al. | 709/204 |
| 6,175,743 B1 | * | 1/2001 | Alperovich et al. | 455/466 |
| 6,282,180 B1 | * | 8/2001 | Paneth et al. | 370/330 |

FOREIGN PATENT DOCUMENTS

| | | |
|---|---|---|
| EP | 0 342 295 A3 | 11/1989 |
| WO | WO 88/05239 | 7/1988 |
| WO | WO 89/09530 | 10/1989 |
| WO | WO 95/23484 | 8/1995 |

* cited by examiner

Primary Examiner—Edward F. Urban
Assistant Examiner—Charles Craver
(74) Attorney, Agent, or Firm—Perman & Green, LLP

(57) ABSTRACT

A method for performing an opinion poll with a mobile communication system having a data processing block, a plurality of recipient mobile stations comprising a wireless communication block and a display, and service center having a buffer. A query message is entered to the data processing block, a predetermined answering period is defined, and the buffer is provided with the query message. This is followed by attempting to send wirelessly the query message from the buffer substantially simultaneously to the recipient mobile stations, attempting again if necessary, and storing at least temporarily the query message at the recipient mobile stations. The query messages are then presented at recipient mobile stations and their users are allowed, at a convenient moment, to enter a written answer message to the mobile station. The written answer messages are sent wirelessly to the service center, forwarded from the service center to the data processing block; and processed by the data processing block, if received by the processing block within the answering period.

10 Claims, 1 Drawing Sheet

OPINION POLL UTILIZING A WIRELESS DATA TRANSMISSION CONNECTION

BACKGROUND OF THE INVENTION

The present invention relates to a method for transmitting messages and the processing of received answers to the transmitted messages. A further object of the invention is a system for transmitting messages and the processing of received answers to the transmitted messages, which system comprises a communicator's (message sender's) data processing system comprising means for selecting a target group, for transmitting a message and for receiving answers, a service center comprising means for transferring the message and the answer, and a telecommunication device for receiving messages.

The invention relates in particular to making small-size opinion polls, but it is possible to utilize the method according to the invention also in other two-way communication. In the following the invention is through explained in an exemplary way in particular in connection with making opinion polls.

Opinion polls have traditionally been made by mailing a questionnaire to the answering party, by making personal on-site interviews, by making personal interviews by telephone and by requesting in television and/or radio broadcasts the interviewees to call certain telephone numbers, in which case the opinion is expressed by dialing a telephone number corresponding to the opinion or by entering DTMF-signals, i.e. by pushing the telephone keys based upon a voice or a vocal message heard from the called-up telephone number. In publication WO 88 05 239 "Improved polling system" it is explained a system operating in the fixed telephone network, in which system by utilizing programmable units and a voice messages a data system is made to call the interviewees, who answer the questions using their telephone devices according to the instructions of the voice message.

A letter poll can be directed to a certain area, in which case the persons selected to be interviewed are selected based upon their area of residence. A letter poll cannot be directed to persons who were in a certain area at a certain moment.

The problem of a letter poll is also its slowness. The preparing of the material, mailing and the passage of mail itself to both directions all consume their own time. The slowness is increased by the fact that the transfer of the answer information to the enquirer's data processing system for analyzing involves a delay. Another disadvantage is also that a letter poll is delivered to an interviewee's address or to an address into which the interviewee has redirected his/her mail, independent of where the interviewee is at the moment. A further problem of a letter poll from a recipient's point of view is that if he/she does not check his/her mail during the answering period, an outdated enquiry cannot be removed from his/her mail. Answering a letter poll further requires that the interviewee takes his/her answer to a letter box.

Personal on-site interviews can be directed to a certain area. Additionally, they can be directed to persons being in this area during a certain period. The period must however be rather long. Normally there are so many persons in an area that only a small part of them is reached. Interviewees selected based upon their place of residence are only reached when at home, in which case an interviewer may have to make several visits. The problem is, independent of the selecting criterion, that the coverage of a poll is highly dependent on the number of persons present on the site. A further problem is that the interviewees cannot be reached simultaneously. From an interviewee's point of view the disadvantage is that he/she should have time to answer the questions just at the time of an interview. Also slowness is a problem of an on-site interview. The preparing of material, printing, an eventual selecting of the interviewers and the interviewers' moving to the site of interview, the interview itself, delivering the answers to the subscriber of the poll and transferring the answer information into the enquirer's data processing systems consume time. In addition to above, the problem of an on-site personal interview is that an interviewer may unconsciously, or even consciously, influence the answers given by the interviewee with his/her body language and/or by presenting the question using his/her own words.

Telephone interviews can be directed to a certain area. In this case the persons selected to be interviewed are selected based upon their place of residence. In prior known methods enquiries cannot be directed to persons who were in a certain place at a certain moment. Even the telephone interview method utilizing a voice message and several telephone lines simultaneously, which was presented in publication WO 88 05 239, has shortcomings. If there is no answer in a telephone number or it is busy, it must be called again, possibly even a number of times during the interview period. In addition to that the number of telephone lines connected to a "polling center" limits the number of interviewees who can be reached simultaneously. Because in the method the answering is done using the dialing equipment of a telephone, the questions are limited to multiple-choice questions only. From the point of view of an interviewee who has answered the phone, the problem of the method is that he/she should have just at the moment of enquiry time to answer the questions.

An opinion poll, in which answers are requested over a television and/or radio broadcast to call certain telephone numbers or to express their opinions in another way, has the problem of limiting the target group and the geographical focusing of a poll. It is possible to try to limit the target group through selecting the media and the broadcasting time, but it is not possible to select the target group demographically. The problem in geographic focusing is that even the smallest area to which a poll can be focused, is geographically a quite large one (e.g. the coverage of a local radio broadcast).

U.S. Pat. No. 5,226,177 (Nickerson) discloses an opinion poll system utilising a radio link connection between central station and user stations. The system comprises plurality of dedicated handsets for transmission of user responses to a local base station. The opinion poll questions are delivered over a common TV-broadcast. The system offers real-time answering and updating opinion poll charts. Updated charts can further be broadcasted and shown also to the audience with handsets. While the system has advantages of real-time opinion polls with wireless handsets, it has several disadvantages such as: 1. The user's station is not capable for receiving and displaying only a short index (question reference) of maximum 3 digits. 2. The user's station must be relatively close to the central station to confirm a wireless link (radio link or wireless infrared- or optical link etc.) to the central station and therefore the system is basically for local use only. 3. The purpose of the handset according to this system is to provide the user with possibility to answer questions shown in an on-line or off-line media (TV, radio, and newspapers). The handsets are therefore not likely to become popular and thus the system can not offer substantial percentage of voters among a large population.

The publication of WO patent application 89 09 530 discloses a real time automated interactive mass communications system. The system is arranged to make telephone calls to a number of telephone subscribers. Once a recipient answers a call, a recorded audio message will be played to present the question(s). The user can give an answer by means of dialling certain number by and ordinary telephone device used to answer the telephone call. An automated system gathers the results from the various users. As the system uses an on-line telephone method, it suffers from the same disadvantages as mentioned before in case of WO 88 05 239.

U.S. Pat. No. 5,036,389 discloses a system, where a satellite TV-program carries the question of an opinion poll and a user is equipped with special devices providing a possibility to reply to an opinion poll question over a satellite link. While this system can offer a large coverage area, each participant of an opinion poll must follow a satellite TV-program to be able to see the question and answer it, and answering must be done almost instantaneously, while the question is shown in the TV-program. The required satellite television equipment also makes this system fairly complicated and expensive, which inherently restricts the possible number of users.

U.S. Pat. No. 5,311,507 "Automated interactive mass communications system" utilises automated on-line interview very similar to the same inventor's patent WO 89/09530 referred above.

The problem of all above presented methods is that they are very poorly suited for making a small poll with at most a few questions.

SUMMARY OF THE INVENTION

The object of this invention is to solve the above problems and to provide a quick method, which reaches one target group at one time and offers versatile geographic focusing possibilities and normal other selecting criterion and which is well suited for even small opinion polls. This goal is achieved with the method according to the invention, which method is characterized in that a message is entered from a communicator's data system through a service center utilizing wireless data transmission connection essentially simultaneously to at least two recipients to the recipients' telecommunication devices, which service center buffers said message for sending it later if any of recipient's telecommunication devices is unable to receive said message, the recipients are allowed to view said message on a display of said devices and are allowed to reply at a moment suitable for the recipient, whereby the interviewees use their telecommunication devices to feed the answer to the message through the service center utilizing wireless data transmission back to the communicator's data system, which expects the answers for a certain, predetermined time, and the information contained in each answer is processed in a predetermined way in the communicator's data system.

The concept essentially simultaneously means in this context that small differences may occur in the time of transmitting a message, which differences are due to delays connected with data processing and data transfer caused by the executing equipment and/or software for example because of eventually required database searches.

A further object of the invention is a system in which the method according to the invention can be utilized. A system according to the invention is for transmitting messages and for the processing of the answers arrived to the questions, which system comprises a communicator's data processing system, comprising means for selecting a target group, for transmitting a message and for receiving answers, a service center comprising means for transferring the message and the answer, and a telecommunication device for receiving messages, is characterized in that the communicator's data processing system, comprises means for feeding the message to the service center, and means for receiving each answer to the message from the service center and means for analyzing the information contained in the answers in the communicator's data processing system, the service center comprises means for receiving the message from the communicator's data processing system and means for transferring the message over a wireless telecommunication system substantially simultaneously to the telecommunication devices of at lease two recipients, wherein said means for transferring the message are arranged to buffer said message for sending said message later if any of said telecommunication devices is unable to receive said message, and said service center further comprises means for receiving the recipients' answers and for transferring them further to the communicator's data processing system, and the telecommunication device comprises means for receiving the message, a user interface for presenting the information contained in the message to the recipient, means for entering the answer to the telecommunication device, and means for transmitting the answer entered at a moment suitable for the recipient by the recipient using the user interface having a display, utilizing the service center, over the wireless data transmission connection to the communicator's data processing system.

The concept message means in this context any message containing at least one question, which a recipient is desired to answer. A message can thus be an opinion poll with one or several questions or some other opinion enquiry, an official communication containing a question or an advertisement containing a question.

The concept communicator means in this context a sender of a message who makes the inquiries for himself or as a research assignment.

The concept service center means in this context a center belonging to a telecommunication network, which center is capable of attending to the transmitting of messages to right recipients in a format suitable for the latter and of transferring the answers to the communicator in a correct format. Such a service center can be e.g. the short message service center of a GSM-mobile communication network.

The concept telecommunication device means in this context any device suited for wireless communication, with the help of which a recipient can both receive a message and send an answer to the message. Such a telecommunication device can be for example any radio transmitter, such as e.g. a mobile telephone operating over base stations or eventually over a satellite or e.g. a two-way-pager or e.g. a device of PDA (Personal Digital Assistant)-type.

The concept user interface means in this context those parts of a telecommunication device or a part or sub-unit connected to a telecommunication device, by using which the communication is executed. Such a user interface is e.g. the entity formed by the display and keypad of a mobile telephone.

The invention is based upon the concept that polls can be made quickly thanks to the wireless telecommunication, effectively and using little manpower by focusing a poll according to the present selecting criterion (e.g. area of residence, demographic factors) or based upon the location of a telecommunication device at a given moment (e.g. a superstore). The invention is very well suited for small-form polls including a few questions. The most significant advantages of the solution according to the invention are thus the simultaneous distribution of the message to an unlimited amount of recipients, the reaching of the recipients based upon their location at the moment of reception, and that the message can be answered when it is best suited for the recipient and the answer can be sent from the recipient's present location, and that it is possible to select persons who have been in a certain area at a given moment as a target group, and that said area can be limited to be very small by utilizing the cellular structure of the telecommunication system, and that a message can be provided with a time stamp, in which case an outdated message is automatically removed, and that the invention offers the possibility of crediting an interviewee's account with an answering fee.

In a preferable embodiment of the invention the GSM-mobile telephone system is used as the wireless telecommunication system. This embodiment according to the invention is very advantageous, because its short messages can be delivered even if a telecommunication device is busy. In addition to it, its short message service center takes care of delivering a message during the validity of the message, if a recipient's telecommunication device, i.e. a mobile telephone of the GSM-system, has not been in connection with the mobile telephone network at the moment a message was transmitted.

BRIEF DESCRIPTION OF THE DRAWINGS

The invention is described in more detail in the following with reference to enclosed figures, of which

DETAILED DESCRIPTION OF THE INVENTION

Figure 1:
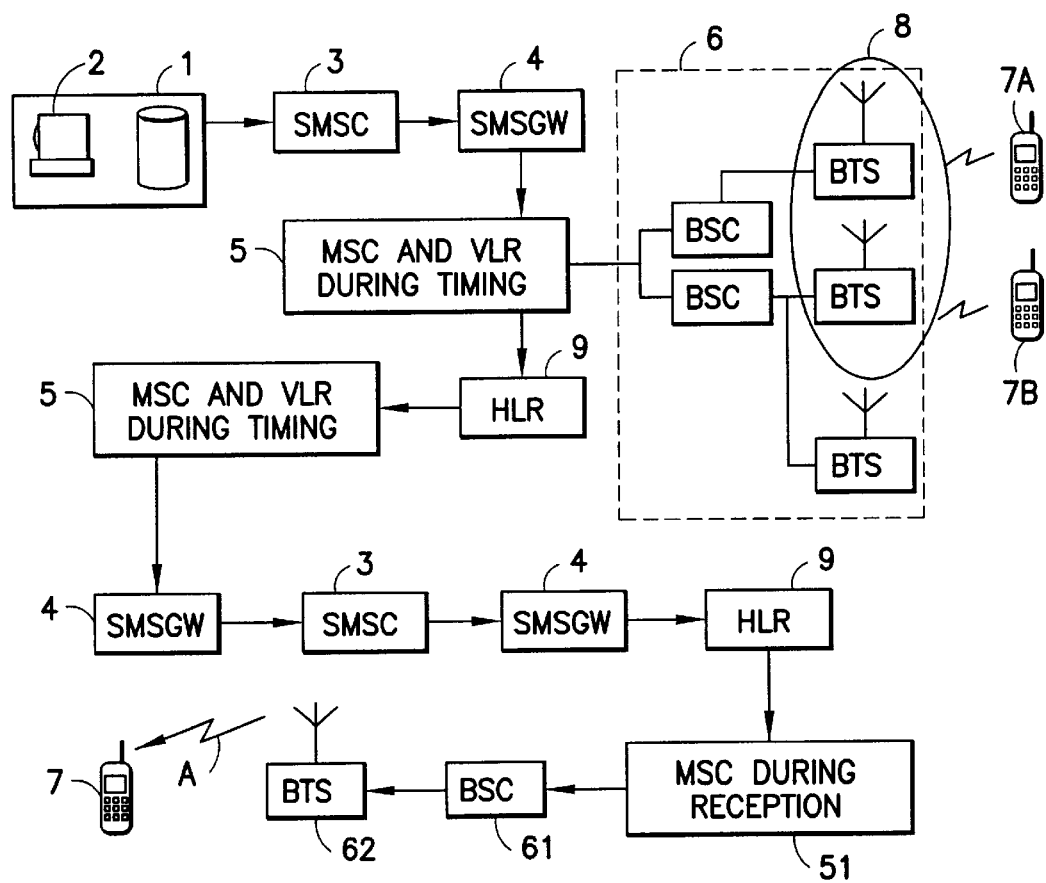
FIG. 1 presents the transmitting of a message to recipients who were in a certain area at a certain moment.

FIG. 1 presents a block diagram connected with the transmitting of a message in a first preferable embodiment of the system according to the invention, in which embodiment it is as an example assumed the wireless telecommunication system to be the GSM (Global System for Mobile Communications)-system, the service center to be the short message service center SMSC (Short Message Service Center) of the GSM-system, the telecommunication device to be a mobile station MS (Mobile Subscriber) of the GSM-system and the target group selected to be the persons staying in a certain area at the so called timing moment. In connection with the short message service center it has been used the term SMSGW (Short Message Service Gateway), which is the common term for SMSGMSC (Gateway Mobile Switching Center for Short Message Services) and IWMSC (Interworking Gateway Mobile Switching Center for Short Message Services). The invention is explained in the following as an example assuming that the length of a message to be transmitted is between 94 and 160 characters, in which case it can, according to the present GSM-specifications, be transmitted as a normal short message SM (Short Message) of the mobile communication system, but it cannot be transmitted using the general short message broadcasting service because of the length of the message.

The GSM-system and its short message service are well known by a person skilled in the art, and thus they are not described in more detail in this context.

When communicator 1 has prepared message A, selected using his data system target area 8 and a timing, i.e. the moment when persons in area 8 with their mobile telephones are of interest, and possibly the moment for transmitting the message, if it deviates from the timing, the last time of validity for the message, the last reception time of the answers and possibly the bonus to be granted, the data system of the communicator sends, based upon the command of the communicator, the above information, as a common term for which it is used in the following the term assignment, to short message service center 3. The sending can take place over any network, for example such as the digital multiservice network ISDN (Integrated services digital network), the public, fixed telephone network PSTN (Public Switched Telephone Network) or PLMN (Public Land Mobile Network). Short message service center 3 decodes the received message into parts and enquires using short message service gateway 4, utilizing mobile switching center MSC (Mobile Switching Center) and visitor register VLR (Visitor Location Register) 5 and base area subsystem BSS (Base Station Subsystem) 6, from home register HLR (Home Location Register) 9 the required subscriber data of mobile stations 7A and 7B in target area 8. The subscriber data of each mobile station 7A and 7B in target area 8 is transferred from the own home register 9 of each one, using the assistance of the mobile switching center of the timing moment and visitor register 5 and short message service gateway 4, to short message service center 3, which at the desired moment of enquiry, which in the following is called reception moment, transmits message A, which is a short message, which it has extracted from the assignment, to mobile telephone 7 asking for the routing instructions to mobile telephone 7 from home register 9 of the mobile telephone using reception moment mobile switching center 51, base station controller BSC (Base Station Controller) 61 and base station BTS (Base Transceiver Station) 62. If mobile telephone 7 is switched off or in a shade area, short message service center 3 buffers message A to mobile telephone 7, and transmits message A when mobile telephone 7 again is in connection with the network, if the message still is valid. Target area 8 can consist of one cell, a combination of several cells, a location area or location areas. It is also possible to define the cell of a movable base station as a target area. Depending on the movements of the mobile telephone the mobile switching center, the visitor register and/or the location cell of the mobile telephone may remain the same or change between the timing moment and the reception moment. In any case the system takes care of the message being delivered to the recipient based upon the actual location of the recipient.

Figure 2:
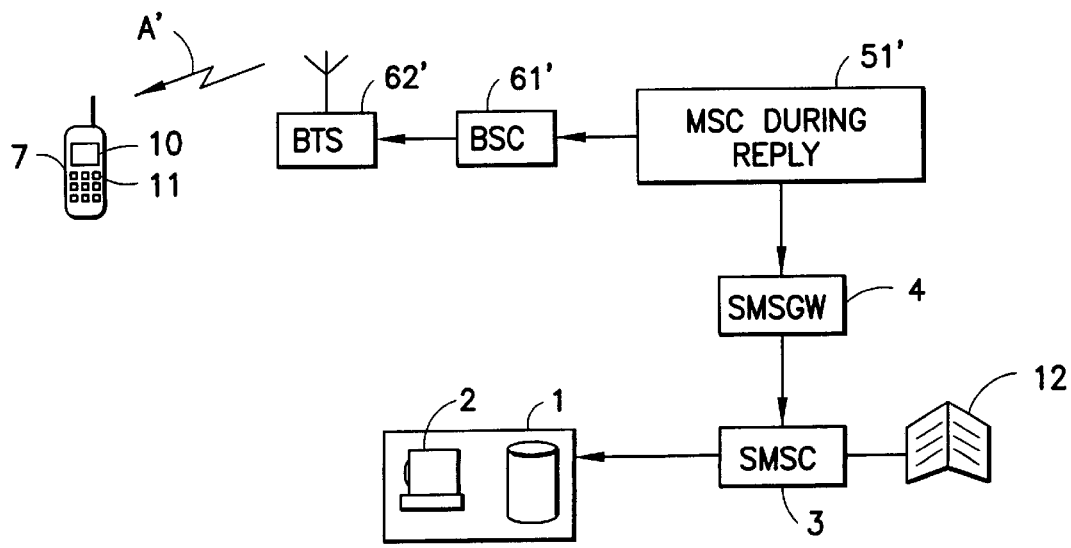
FIG. 2 presents the delivering of an answer to a communicator.

FIG. 2 presents a block diagram connected with answering to a message in the first preferable embodiment of the system according to the invention, which has been explained earlier. In FIG. 2 a recipient has received message A and read it in display 10 of his/her mobile station 7. At a time suitable for him/her he/she answers the question/questions using display 10 and keypad 11 and transmits his/her answer A' as a short message over base station 62' corresponding his/her present location, i.e. the location at the answering moment, base station controller 61', and mobile switching center 51', assisted by short message service gateway 4, to short message service center 3. Short message service center 3 checks whether the answering time of communicator 1 still is valid and if it is, it sends answer A' to the communicator's data system 2 for further processing. If the answering time has expired, short message service center 3 throws the answer to a "dustbin". Short message service center 3 credits the interviewee's account 12 according to the instructions of communicator 1. The instructions are received by short message service center 3 either together with the assignment from a data processing system or afterwards from the communicator, when the communicator's data system has analyzed answer A' and verified it to be worth a reward. Data system 2 of communicator 1 processes the answers by analyzing them in a way desired by the communicator. The analyzing may include creating statistics and/or other prior known methods of analyzing opinion polls.

It is self evident for a person skilled in the art how the communication in FIG. 1 takes place in the GSM-system using the general distribution of a short message service center, and how it takes place when the selecting of a target group is made based upon something else than the location at a given time. It is also self evident for a person skilled in the art how the communication explained above in FIGS. 1 and 2 is arranged using other wireless data transfer systems and/or service centers. It is further self evident for a person skilled in the art that the invention in no way limits the length of a message.

It has to be understood that the above explanation and the figures connected with it have only been meant to illustrate the present invention. To a person skilled in the art the different variations and modifications of the invention will be evident without deviating from the scope of the invention presented in enclosed claims.

What is claimed is:

1. In a mobile communication system comprising:
   a data processing block;
   a service center having a buffer, configured to communicate with the data processing block; and
   a plurality of recipient mobile telephones each assigned to at least one user and each comprising a display and a wireless communication block for communicating with at least one base station of a mobile telephone network;
   a method comprising the steps of:
   entering a query message to the data processing block;
   defining a predetermined answering period for answering to the query message;
   sending the query message from the data processing block over a network to the service center;
   storing the query message in the buffer of the service center;
   attempting to send wirelessly the query message from the service center substantially simultaneously to at least two of the recipient mobile telephones;
   attempting again to send the query message to any of said at least two recipient mobile telephones to which the attempting to send the query message has not succeeded;
   storing at least temporarily the query message at the recipient mobile telephones;
   presenting the query message at each recipient mobile telephone to which said query message has been sent;
   allowing each of the users of each recipient mobile telephone, at a suitable moment for that user, to enter an answer message to the mobile telephone in reply to the query message;
   sending wirelessly over the mobile telephone network the answer message from the mobile telephone to said service center;
   forwarding the answer message from said service center to said data processing block; and
   processing each answer message received within said answering period in a predetermined way in the data processing block.

2. A method according to claim 1, wherein the service center is a short message service center of the mobile communication system, and wherein the step of sending the query message to at least two of the recipient mobile stations is accomplished by short message service.

3. A method according to claim 1, wherein the mobile communication system is a cellular mobile communication system comprising a plurality of communication cells; further comprising the steps of:
   determining the location of a plurality of mobile telephones in said mobile communication system at a given time using the communication cells; and
   selecting the recipients based upon said determined locations.

4. A method according to claim 3, wherein said determining the location of said plurality of mobile telephones has an accuracy of one cell.

5. A method according to claim 1, further comprising a step of analyzing the answer messages statistically by the data processing block.

6. A mobile communication system comprising:
   a data processing block;
   means for entering a query message to the data processing block;
   means for defining a predetermined answering period;
   a service center having a buffer for receiving and storing the query message, the data processing block being configured to send the query message from the data processing block over the network to the service center, the service center being configured to attempt sending wirelessly the query message substantially simultaneously to at least two recipient mobile telephones;
   a plurality of recipient mobile telephones of a mobile telephone network each assigned to at least one user and each comprising a wireless communication block and a display,
   wherein the service center is configured to attempt sending again said query message to any of said at least two recipient mobile telephones to which the attempting to send the query message has not succeeded;
   means for storing at least temporarily the query message at the recipient mobile telephones;
   means for presenting the query message at each recipient mobile telephone to which said query message has been sent;
   means for allowing each of the users of the recipient mobile telephones, at a suitable moment for that user, to enter an answer message to the mobile telephone in reply to the query message;
   wireless communication blocks at the recipient mobile telephones for sending wirelessly over the mobile telephone network the answer message to said service center;
   means for forwarding the answer message from said service center to said data processing block; and
   wherein the data processing block is configured to process in a predetermined way each answer message received within said predetermined answering period.

7. A system according to claim 6, wherein said service center is a short message service center.

8. A system according to claim 6 wherein said query message is in a digital format.

9. A system according to claim 6, wherein the means for presenting the query message is a display.

10. A mobile communication system comprising:

a data processing block;

means for entering a query message to the data processing block;

means for defining a predetermined answering period;

a service center having a buffer for receiving the query message, configured to attempt sending wirelessly the query message substantially simultaneously to at least two of the recipient mobile stations;

a plurality of recipient mobile stations each assigned to at least one user and each comprising a wireless communication block and a display, the service center being configured to attempt sending again said query message to any of said at least two recipient mobile stations to which the attempting to send the query message has not succeeded;

means for storing at least temporarily the query message at the recipient mobile stations;

means for presenting the query message at each recipient mobile station to which said query message has been sent;

means for allowing each of the users of the recipient mobile station, at a suitable moment for that user, to enter an answer message to the mobile station in reply to the query message;

wireless communication blocks at the recipient mobile stations for sending wirelessly the answer message to said service center;

means for forwarding the message from said service center to said data processing block; and the data processing block being configured to process in a predetermined way each answer message received within said predetermined answering period; and wherein the service center comprises means for crediting an interviewee's account with a sum determined by the data processing block in response to receiving said answer message.

* * * * *